United States Patent
Wallace et al.

(10) Patent No.: US 6,198,186 B1
(45) Date of Patent: Mar. 6, 2001

(54) THERMALLY SELF-PROTECTED ELECTRIC MOTOR

(75) Inventors: Stanley E. Wallace, Athens, GA (US); Edward J. Swan, Greenville, SC (US)

(73) Assignee: Reliance Electric Technologies, LLC, Thousands Oaks, CA (US)

(*) Notice: Subject to any disclaimer, the term of this patent is extended or adjusted under 35 U.S.C. 154(b) by 0 days.

(21) Appl. No.: 09/407,607

(22) Filed: Sep. 28, 1999

(51) Int. Cl.$^7$ .................................................. H02K 11/00
(52) U.S. Cl. ...................... 310/68 C; 219/201; 219/494; 361/25
(58) Field of Search ............................... 310/68 C, 68 B; 219/201, 494; 361/24, 25, 26

(56) References Cited

U.S. PATENT DOCUMENTS

| | | | |
|---|---|---|---|
| 3,878,362 | * 4/1975 | Stinger | 219/528 |
| 5,326,026 | * 7/1994 | Jefferson et al. | 236/11 |
| 5,787,568 | * 8/1998 | Crowell | 29/596 |

* cited by examiner

Primary Examiner—Nestor Ramirez
Assistant Examiner—Judson H. Jones
(74) Attorney, Agent, or Firm—Lloyd G Farr; John J. Horn; A. M. Gerasimow

(57) ABSTRACT

An electric motor includes a stator having a plurality of conductive windings radially spaced about a central axis. A rotor is located radially inward up the stator and is rotationally fixed with respect to a shaft along the central axis. The rotor and the stator are disposed in a frame. A heater is in operative communication with the windings. A thermostat is in operative communication with the heater and is configured to activate and deactivate the heater responsively to a motor temperature.

14 Claims, 3 Drawing Sheets

THERMALLY SELF-PROTECTED ELECTRIC MOTOR

BACKGROUND OF THE INVENTION

The present invention relates generally to the art of electric motors, which should be understood as described herein to include generators and other electromechanical machines that effect a conversion between mechanical and electrical power. More particularly, the invention relates to electric motors having protective heaters.

As should be understood by those skilled in this art, electric codes rate motors for use in various environments. For example, the most stringent criteria are reserved for "explosion-proof" motors. Below this level are motors rated for use in "division 2" areas. These motors need not meet the explosion-proof standards, and are therefore less expensive, but are restricted not to exceed a prescribed surface temperature.

Division 2 motors are sometimes exposed to air having a high relative humidity. To prevent condensation on the windings, space heaters have been applied on or within the motor frame, for example as a wrap on the windings or as a cartridge mounted in the frame. The heater may be controlled by the user or may be automatically activated upon deactivation of the motor. In either case, the heater is activated at a period when the motor is at or near its normal operating temperature. It may be possible, therefore, that the additional heat raises the motor's temperature above a maximum desired temperature, for example the temperature rated for a division 2 area.

SUMMARY OF THE INVENTION

The present invention recognizes and addresses disadvantages of prior art constructions and methods.

Accordingly, it is an object of the present invention to provide an improved electric motor.

This and other objects are achieved by an electric motor including a stator having a plurality of conductive windings radially spaced about a central axis. A rotor is located radially inward of the stator and is rotationally fixed with respect to a shaft along the central axis. The rotor and stator are disposed in a frame. A heater is in operative communication with the windings. A thermostat is in operative communication with the heater and is configured to activate and deactivate the heater responsively to a motor temperature.

The accompanying drawings, which are incorporated in and constitute a part of this specification, illustrate one or more embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended drawings, in which.

Figure 1:
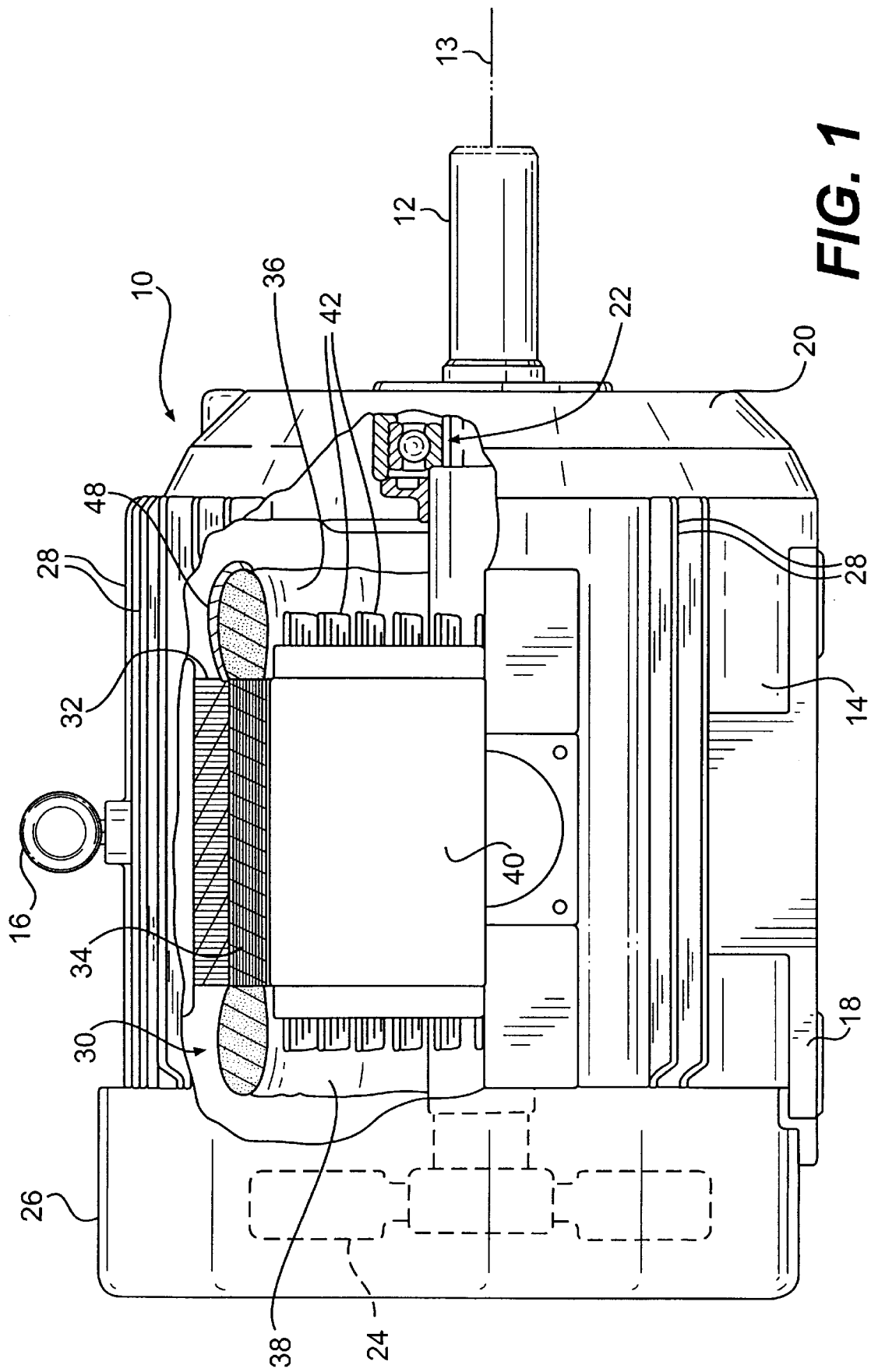
FIG. 1 is a plan view, partly in section, of an electric motor constructed in accordance with a preferred embodiment of the present invention.

Repeat use of reference characters in the present specification and drawings is intended to represent same or analogous features or elements of the invention.

DETAILED DESCRIPTION OF PREFERRED EMBODIMENTS

Reference will now be made in detail to presently preferred embodiments of the invention, one or more examples of which are illustrated in the accompanying drawings. Each example is provided by way of explanation of the invention, not limitation of the invention. In fact, it will be apparent to those skilled in the art that modifications and variations can be made in the present invention without departing from the scope or spirit thereof. For instance, features illustrated or described as part of one embodiment may be used on another embodiment to yield a still further embodiment. Thus, it is intended that the present invention covers such modifications and variations as come within the scope of the appended claims and their equivalents.

Figure 2:
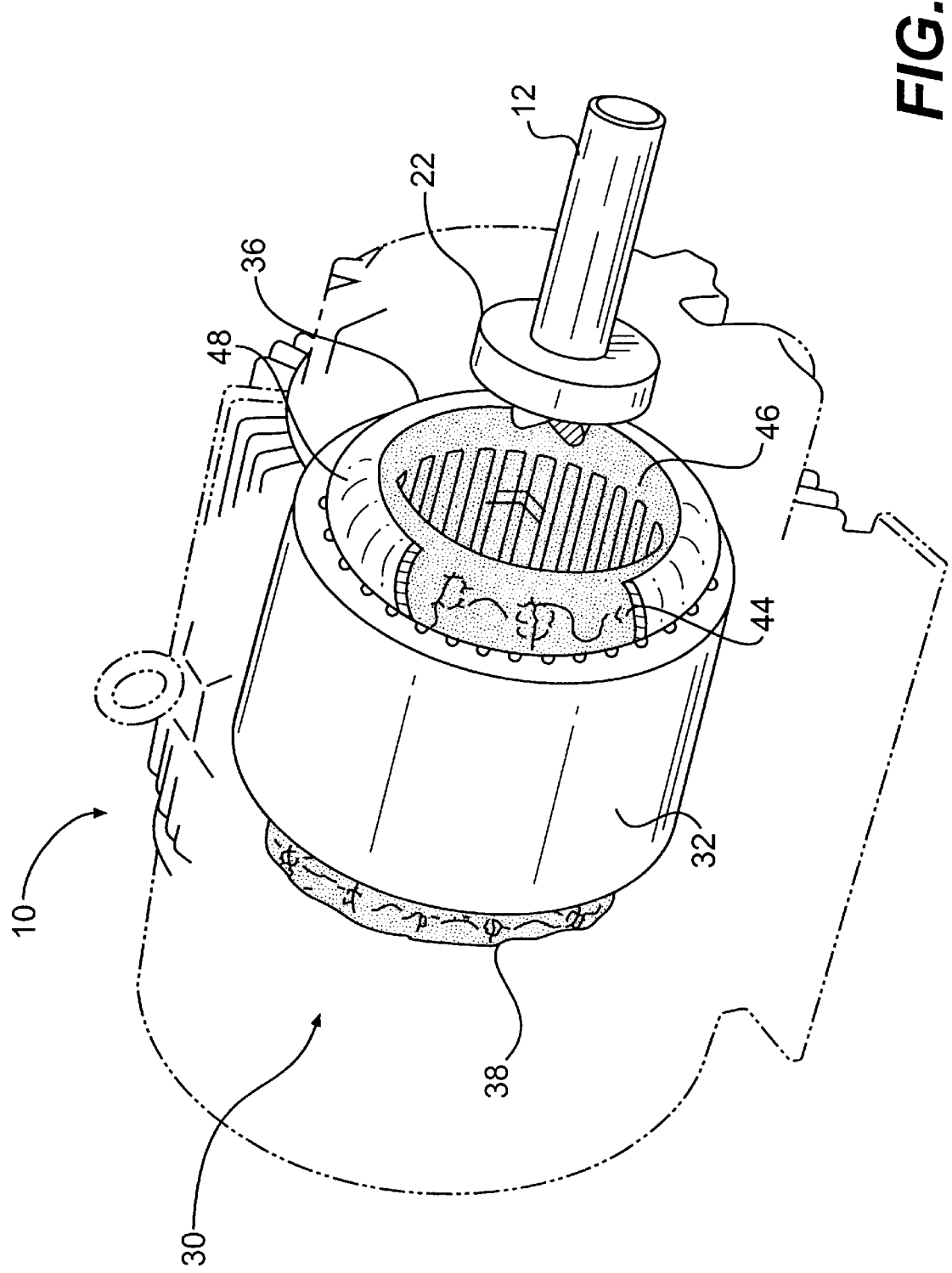
FIG. 2 is a partial perspective view of the motor in FIG. 1, particularly illustrating the stator core.

FIGS. 1 and 2 illustrate a motor 10 constructed in accordance with one preferred embodiment of the present invention. While the term "motor" is used throughout the present specification, including the appended claims, it should be understood that this term includes any suitable electromechanical device effecting a conversion between mechanical and electrical power, for example including a generator.

Motor 10 has a rotatable shaft 12 extending along a central axis 13. The internal components of motor 10 are enclosed by a housing that includes a main housing portion, or frame, 14. One or more eyebolts 16 may be provided for lifting motor 10. Main housing portion 14 defines an appropriate base 18 on which motor 10 rests during use.

The housing of motor 10 further includes end portions, such as end bell 20, located at respective axial sides of main housing portion 14. The end portions may be attached to the main housing portion by any appropriate means, such as by bolts. Typically, each end portion maintains a respective bearing assembly, such as bearing assembly 22, to facilitate rotation of shaft 12.

Shaft 12 continues through bearing assembly 22 and beyond end bell 20 for connection to other equipment. The opposite end of shaft 12 carries a fan 24 located within a shroud 26. Due to the shroud's configuration, rotation of fan 24 causes cooling air to circulate around various cooling fins 28 defined on the exterior of main housing portion 14.

Inside the housing, motor 10 includes a stator 30 that remains fixed during operation. Stator 30 includes a magnetically permeable core 32 preferably comprising a plurality of relatively thin laminations arranged in a stack. As indicated at 34, longitudinal windings are located in parallel, axially-extending slots defined about the inside surface of core 32 to provide a flow path for flux-generating current. The windings turn at respective coil heads 36 and 38 to return along a parallel slot.

A rotor 40 is secured to shaft 12 and rotates based on electromagnetic interaction between it and stator 30. In the illustrated embodiment, motor 10 is an induction motor, wherein rotor 40 is constructed as a "squirrel cage" in a known matter. A plurality of radial vanes 42 may be provided at the periphery of the rotor ends to circulate cooling air inside the motor housing.

A nonconductive top coat 44, such as a known protective paint, may be applied over coil heads 36 and 38, as well as other exposed surfaces of stator 30, to provide protection against corrosion. To reduce capacitive coupling between the stator and rotor, an electrostatic shield arrangement indicated generally at 46 may be disposed between rotor 40 and the conductive windings of stator 30. Generally, shield arrangement 46 includes an insulative layer located on the inside surface of coil heads 36 and 38 and along the entire axial extent of each winding slot. Preferably, the conductive layer is in electrical communication with core 32, such as by contact with the inside walls of the winding slots. The conductive layer may be a conductive paint applied by spraying or brushing.

Figure 3:
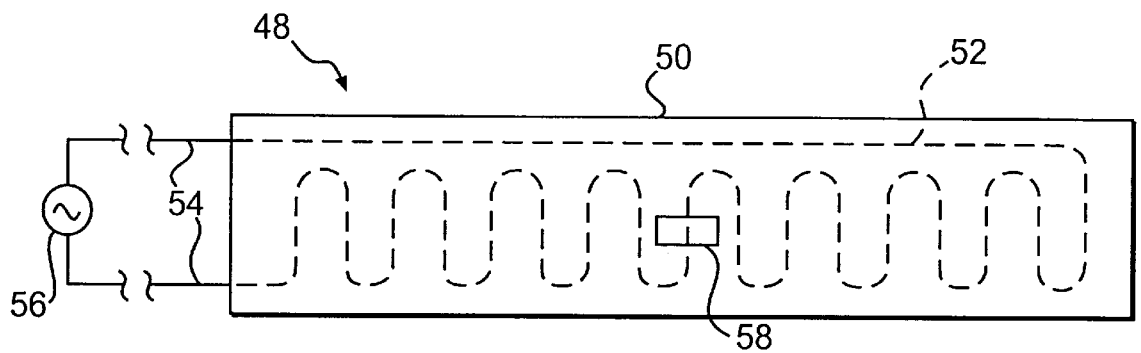
FIG. 3 is a schematic illustration of a space heater for use with an electric motor constructed in accordance with the present invention.

A space heater 48 is wrapped around coil head 36. Referring also to FIG. 3, the space heater includes a polymer sheath 50 enclosing a wire heating element 52 connected to leads 54 that are in turn connected to an AC power source 56. Sheath 50 may be made from any suitable material, for example polyester. In one preferred embodiment, heating element 52 is made from fourteen gauge copper wire. A similar space heater may be wrapped about coil head 38 instead of or in addition to heater 48.

A thermostat 58 within heating element 52 is connected in series between power source 56 and heater 48. In a preferred embodiment, thermostat 58 is a bimetallic switch. When the switch is closed, electric current from power source 56 flows through heating element 52 to generate heat. Opening of the bimetallic switch electrically opens the heating element, thereby deactivating heater 48. The construction and operation of bimetallic switches should be understood in this art and is therefore not described in detail herein. It should be understood, however, that the metallic connections within such switches open and close based on ambient temperature and that bimetallic switches are commercially available that open and close at various predetermined temperatures.

Figure 4:
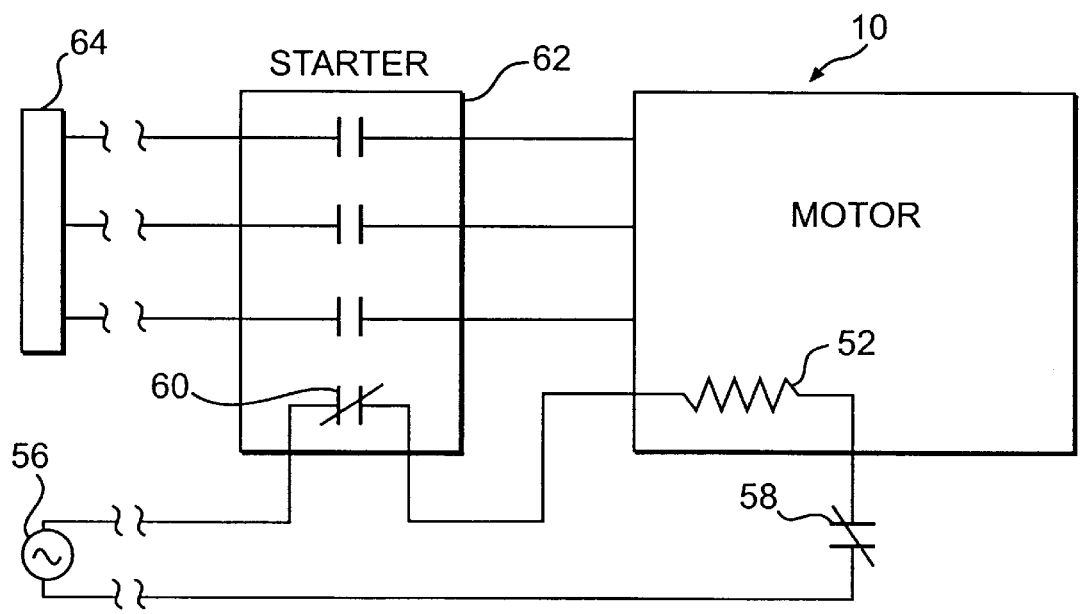
FIG. 4 is an electrical diagrammatic illustration of an electric motor in accordance with a preferred embodiment of the present invention.

FIG. 4 provides an electrical schematic diagram of a motor 10 in which a space heater 48 (FIGS. 1 and 2) is wrapped around a coil head so that heating element 52 provides heat to the windings. The space heater is connected to power source 56 through an auxiliary pole 60 of a starter 62. Starter 62 includes three primary poles that connect the stator windings to a three-phase power source 64. The starter acts as a switch that controls the auxiliary pole responsively to the primary poles. Specifically, when the primary poles are closed (i.e. when motor 10 is activated), the auxiliary pole is open (i.e. the space heater is deactivated). Conversely, opening of the primary poles closes the auxiliary pole.

Accordingly, when the motor is activated, the space heater is deactivated, and motor-generated heat prevents condensation on the windings. Because the deactivated space heater provides no additional heat, the motor remains within its rated temperature limits as determined by its construction. Upon deactivation of the motor, however, auxiliary pole 60 is closed so that power source 56 is applied to the heater and the thermostat. Thermostat 58 is chosen, however, to open and close at a temperature within a range from a minimum temperature necessary to prevent condensation up to the motor's rated temperature. Preferably, the thermostat deactivates the heater at a temperature below the motor's highest rated temperature and activates the heater at a temperature above the minimum temperature necessary to avoid condensation. Depending on the thermostat's construction, these temperatures may be the same. Accordingly, upon deactivation of motor 10, the thermostat does not activate the heater until the motor cools to a temperature such that application of the additional heat does not cause the motor to exceed its rated temperature.

While one or more preferred embodiments have been described above, it should be understood that any and all equivalent realizations of the present invention are included within the scope and spirit thereof. For example, the present invention may be used in conjunction with various industrial motors, including those for use in non-division 2 areas. Furthermore, various types of space heaters may be used, including known tube-like cartridge heaters that are mounted on and within the frame proximate to the windings. Thus, it should be understood by those of ordinary skill in this art that the present invention is not limited to these embodiments since modifications can be made. Therefore, it is contemplated that any and all such embodiments are included in the present invention as may fall within the literal or equivalent scope of the appended claims.

What is claimed is:

1. An electric motor, said motor comprising:
   a stator having a plurality of conductive windings radially spaced about a central axis;
   a rotor located radially inward of said stator and rotationally fixed with respect to a shaft along said central axis;
   a frame in which said rotor and said stator are disposed;
   a heater in operative communication with said windings;
   a control circuit selectively connecting a first power source to said windings and a second power source to said heater, said control circuit configured to disconnect said second power source and said heater when said first power source is connected to said windings and to connect said second power source and said heater when said first power source is disconnected to said windings; and
   a thermostat in operative communication with said heater and configured to activate and deactivate said heater responsively to a motor temperature when said second power source and said heater are connected.

2. The motor as in claim 1, wherein said thermostat is configured to activate said heater above a predetermined temperature and to deactivate said heater below a predetermined temperature.

3. The motor as in claim 1, wherein said heater includes a heating element disposed in a flexible sheath wrapped about said windings.

4. The motor as in claim 3, wherein said thermostat is connected in series in said heating element within said sheath.

5. The motor as in claim 4, wherein said thermostat comprises a bimetallic switch.

6. An electric motor, said motor comprising:
   a stator having a plurality of conductive windings radially spaced about a central axis;
   a rotor located radially inward of said stator and rotationally fixed with respect to a shaft along said central axis;
   a frame in which said stator and said rotor are disposed;
   a heater in operative communication with said windings;
   a first power junction connecting a power source to said windings;
   a second power junction connecting a power source to said heater;
   a first switch operatively disposed in communication with said first junction and said second junction to electrically open said second junction when said first junction electrically closes and to electrically close said second junction when said first junction electrically opens;
   a second switch in series between said heater power source and said heater; and a thermostat configured to electrically open and close said second switch responsively to a motor temperature.

7. The motor as in claim 6, wherein said thermostat is disposed proximate said windings.

8. The motor as in claim 6, wherein said thermostat is configured to electrically open said switch above a predetermined temperature and to electrically close said switch below a predetermined temperature.

9. The motor as in claim 6, wherein said heater includes a heating element disposed in a flexible sheath wrapped about said windings.

10. The motor as in claim 9, wherein said second switch is connected in series in said heating element and said thermostat is disposed within said sheath.

11. The motor as in claim 10, wherein said second switch and said thermostat comprise a bimetallic switch.

12. The motor as in claim 6, wherein said second switch and said thermostat comprise a bimetallic switch.

13. The motor as in claim 6, wherein said first switch and said second switch are separate from each other.

14. An electric motor, said motor comprising:

a stator having a plurality of conductive windings radially spaced about a central axis;

a rotor located radially inward of said stator and rotationally fixed with respect to a shaft along said central axis;

a heater including a heating element disposed in a flexible sheath wrapped about said windings;

a first power junction connecting a power source to said windings;

a second power junction connecting a power source to said heater;

a switch operatively disposed in communication with said first junction and said second junction to electrically open said second junction when said first junction electrically closes and to electrically close said second junction when said first junction electrically opens; and a bimetallic switch in series in said heating element, said bimetallic switch being configured to electrically open said heating element above a predetermined temperature and to electrically close said heating element below a predetermined temperature.

* * * * *